United States Patent [19]

Allemann

[11] Patent Number: 4,929,131
[45] Date of Patent: May 29, 1990

[54] METHOD AND APPARATUS FOR A LINEAL MACHINE TOOL

[75] Inventor: James D. Allemann, Eureka, Mo.

[73] Assignee: Westhoff Toll and Die Company, St. Louis, Mo.

[21] Appl. No.: 328,431

[22] Filed: Mar. 24, 1989

[51] Int. Cl.$^5$ ............................................. B23C 5/26
[52] U.S. Cl. ...................................... 409/234; 279/8;
 408/199; 408/233; 408/239 A; 409/132;
 409/232
[58] Field of Search ........... 408/199, 200, 238, 239 R,
 408/239 A, 233; 409/234, 232, 131, 132; 279/8,
 99; 407/34, 35, 48

[56] References Cited

U.S. PATENT DOCUMENTS

| | | | |
|---|---|---|---|
| 1,520,382 | 12/1924 | Workman | 408/200 |
| 2,977,859 | 4/1961 | Glaser | 407/48 |
| 3,041,898 | 7/1962 | Better | 409/234 |
| 3,091,138 | 5/1963 | Berry, Jr. | 408/233 |
| 3,164,041 | 1/1965 | Carlstedt | 408/239 |
| 3,250,154 | 5/1966 | Breuning | 408/199 |
| 3,811,163 | 5/1974 | Frederick et al. | 407/54 |
| 4,182,587 | 1/1980 | Striegl | 407/48 |
| 4,393,626 | 7/1983 | Schroer | 409/234 |
| 4,557,642 | 12/1985 | Dudas et al. | 279/8 |
| 4,655,655 | 4/1987 | Shurfeld | 409/232 |

FOREIGN PATENT DOCUMENTS

| | | | |
|---|---|---|---|
| 140014 | 2/1980 | German Democratic Rep. | 409/234 |
| 241011 | 10/1986 | Japan | 409/234 |
| 7800009 | 8/1979 | Switzerland | 409/234 |

Primary Examiner—Daniel Howell
Attorney, Agent, or Firm—Rogers, Howell & Haferkamp

[57] ABSTRACT

A cutting tool for a lineal milling machine has a female tapered surface for close tolerance matching to the outer, male tapered surface on the outside of the spindle which mounts the cutting tool to provide the maximum width of support for the cutting edge. The cutting edges comprise a plurality of carbide inserts, each with its own flute formed in the body of the tool, such that as the cutting tool is rotated at high speed an annulus of cutting surface is created which is ideally suited for use with the following method. A new method for lineal machining includes the steps of advancing the cutting tool into the workpiece to form a substantially arcuate edge, retracting the cutting tool from the workpiece, indexing the cutting tool to an overlapping position, and then advancing the cutting tool into the workpiece to remove the amount of overlap, with those steps being repeated to mill pocket openings or for any other lineal milling application.

13 Claims, 2 Drawing Sheets

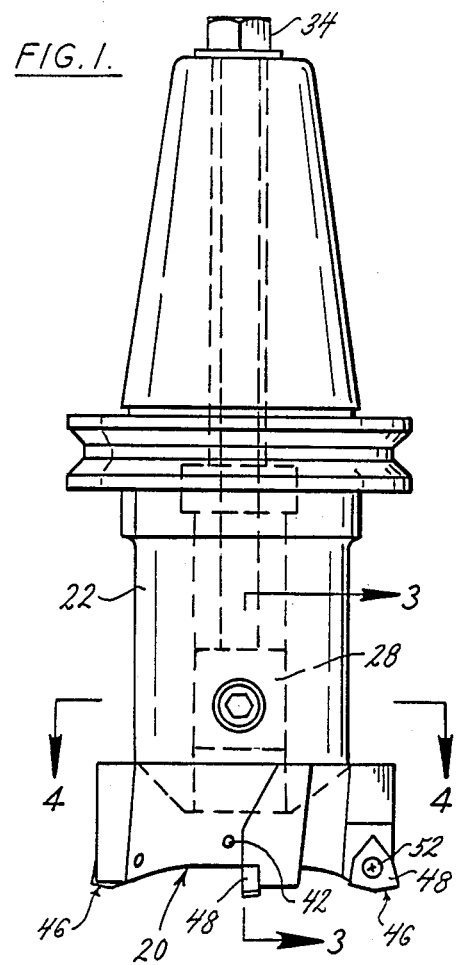
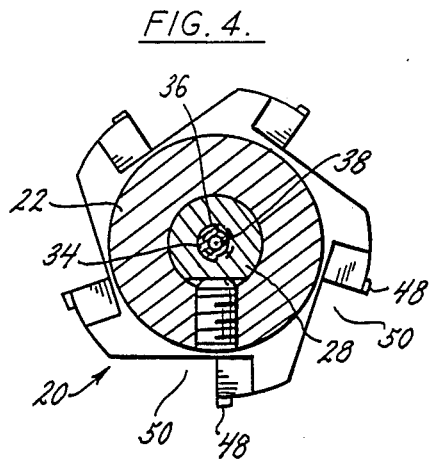
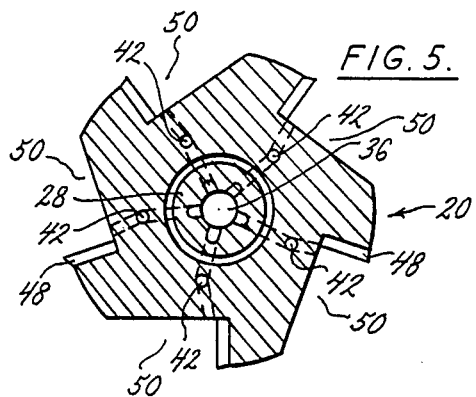
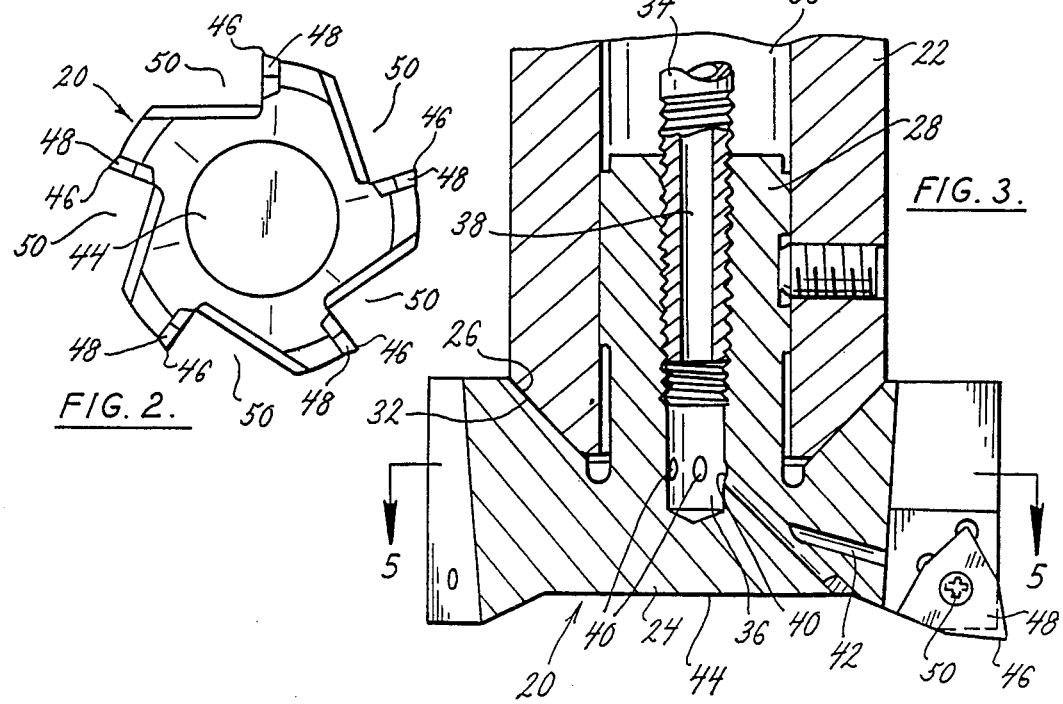
FIG. 1. FIG. 2. FIG. 3. FIG. 4. FIG. 5.

METHOD AND APPARATUS FOR A LINEAL MACHINE TOOL

BACKGROUND AND SUMMARY OF THE INVENTION

There are many techniques in the prior art for milling material from a workpiece. One of the most important of these is lineal milling, or machining, which is characterized by a milling motion which utilizes milling forces parallel to the center line rotation of a spindle or cutting tool to remove metal from the workpiece. This is to be distinguished from conventional milling which typically advances a rotating cutting tool perpendicular to the center line of rotation into a workpiece. Lineal milling provides certain advantages over conventional milling. First of all, the milling forces are supported by the compression strength of the spindle and cutting tool and the spindle thrust bearings as opposed to the lateral rigidity of the cutting tool and spindle which is typically much weaker. Furthermore, greater depth in the opening may be achieved more easily with lineal milling as the length of the cutting tool may simply be increased while increasing the length of the cutting tool for conventional milling further decreases the lateral strength of the tool which can result in deflection of the tool and a failure to achieve the desired result. Therefore, for these and other reasons, lineal milling is much more desirable in many applications than conventional milling.

Perhaps the simplest form of lineal milling is exemplified by a drill press which utilizes a conventional drill bit which may be advanced into a workpiece. However, a drill press is unsuitable for drilling pocket-type openings in that advancing the drill bit into a flat surface is relatively easy while advancing the drill bit into a workpiece such that it overlaps a previously drilled hole has a tendency to deflect the bit. Thus, additional steps with other equipment is required to finish off the machined opening.

The inventor herein is aware of at least one attempt in the prior art to decrease the tendency of the drill bit to deflect as the bit is advanced into a workpiece. In this prior art device, a spindle is used to mount the drill bit to the machine, and the spindle has a female taper, or inner taper, and the drill bit has a matching male taper such that it slides within the opening or envelope provided by the spindle and is secured thereto with a spindle drawbar or the like. While this does improve the support for the cutting tool as it increases the width or base for support of the tool, there are difficulties in implementing it.

First of all, truing of a female taper on a spindle can be quite difficult and time-consuming (and thus expensive). Furthermore, requalifying of the inside taper or female taper of a spindle, as might be expected after some use, would require at least partial disassembly of the spindle.

In order to solve these and other problems in the prior art, the inventor herein has developed a lineal machining tool which can be used to great advantage in pocket-type machining applications, as well as other applications. The lineal machining tool and method of the present invention permits lineal machining of overlapping holes in a manner which "stomps" or "nibbles" material away from the workpiece with successive advances of the machine tool into the workpiece. The machine tool is characterized by a cutting tool which has a female taper which matches and lines up with the outer male taper of the spindle, both surfaces of which are machined or "trued" so as to accurately position the cutting tool with respect to the center line of the spindle. The cutting tool is mounted to the spindle much as with a standard cutting tool, i.e. with a spindle drawbar or center mounting bolt which urges the tapered surfaces into engagement. However, with this arrangement, for the first time, the cutting tool is supported at the widest dimension of the spindle to provide the greatest amount of lateral support to resist deflection of the cutting tool as it is advanced into the workpiece in a lineal machining or milling motion.

Still another feature of the cutting tool of the present invention is that a plurality of replaceable carbide cutting edges are mounted along the outer periphery of the outboard end of the tool such that, when the tool is rotated, the cutting edges circumscribe an annulus which comprises less than all of the surface area of the outboard face. Thus, the cutting tool isolates its cutting surface such that it is uniquely suited for being successively advanced in an overlapping manner into a workpiece. Thus, cutting edges are maximally utilized, especially in a CNC machine, where successive advances of the cutting tool may be accurately controlled to choose the amount of overlap to best advantage.

Because of the tremendous rates at which material is removed from the workpiece, flutes are formed in the body of the cutting tool such that as the cutting edges shave chips from the workpiece, they are directed by the cutting edges up through the flutes and away from the workpiece. Furthermore, lubrication ports are formed in the cutting tool from the center draw bolt to near the carbide cutting edge so that air or lubricating oil may be delivered directly to the cutting edge and surface of the workpiece.

As already alluded to above, the inventor has also succeeded in developing a method for lineal milling which utilizes the tool of the present invention to great advantage. That method includes advancing the cutting tool into the workpiece such that the cutting annulus circumscribed by the cutting edges at least partially overlap the cutting annulus of the previous pass by the cutting tool through the workpiece. After each cutting stroke, the tool is retracted from the workpiece, indexed to a new overlapping position, and then advanced back into the workpiece. With this motion, the tool can be used to great advantage to "nibble" or "stomp" material from the workpiece at tremendous rates in a CNC machine through the use of simple programming techniques as is well known in the art.

While the principal advantages and features of the invention have been described above, a clearer understanding of the invention and its purposes may be attained by referring to the drawings and description of the preferred embodiment which follow.

BRIEF DESCRIPTION OF THE DRAWINGS

FIG. 1 is a side view of the cutting tool mounted to the spindle of a milling machine;

FIG. 2 is a bottom view of the cutting tool;

FIG. 3 is a partial cross-sectional view taken along the plane of line 3—3 in FIG. 1 and detailing the mounting of the cutting tool to the spindle;

FIG. 4 is a partial cross-sectional view taken along the plane of line 4—4 in FIG. 1 and detailing the set screw positioner for locating the cutting tool on the spindle;

FIG. 5 is a partial cross-sectional view taken along the plane of line 5—5 in FIG. 3 and detailing the lubrication porting from the draw bolt through the cutting tool;

DETAILED DESCRIPTION OF THE PREFERRED EMBODIMENT

Figure 6:
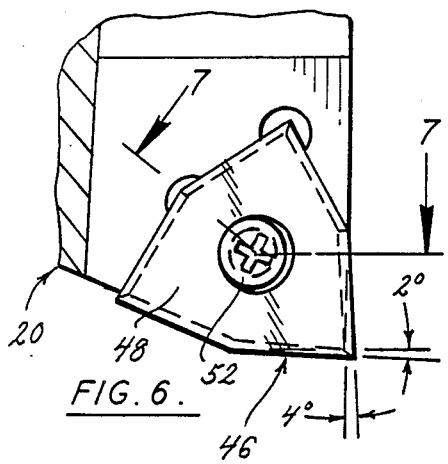
FIG. 6 is a partial view of one of the cutting edges mounted to the cutting tool.
Figure 7:
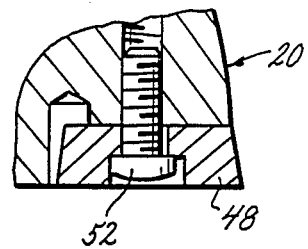
FIG. 7 is a partial cross-sectional view taken along the plane of line 7—7 in FIG. 6 detailing the screw mounting the carbide cutting edge to the cutting tool.

As shown in FIG. 1, and especially in FIG. 3, the present invention includes a cutting tool 20 mounted to a spindle 22 for a milling machine, the details of which are well known in the art and which provide a means for rotating the spindle 22 and cutting tool 20 at a high rate of speed to mill material from a workpiece. The cutting tool includes a body 24 having an inner taper 26 formed along an area adjacent a shank 28 which fits within the cavity 30 of spindle 22. Spindle 22 has a matching outer taper 32 against which the cutting tool inner taper 26 interfits to provide a solid, machined surface, support. A draw bolt 34 screws down within a threaded center cavity 36 of cutting tool 20 and secures it rigidly against the spindle 22 through the matching tapers 26, 32. The lower portion of central cavity 38 has ports 40 which access channels 42 for the flow of air or lubricating oil and fluids to aid in the milling of material from a workpiece, as is well known in the art. The cutting tool 20 has an outboard end or face 44, as shown in FIG. 2, which is generally flat with five cutting edges 46 equally spaced about the periphery thereof. The cutting edges 46 are shown in greater detail in FIGS. 6 and 7 and include a carbide insert 48 which is generally triangularly shaped and which is recess-mounted into one of the flutes 50 of the cutting tool 20. As best shown in FIGS. 2, 4 and 5, each carbide insert 48 is mounted and oriented such that when the cutting tool 20 is rotated, shavings or chips which are created by the carbide insert are directed away from the workpiece through an associated flute or offset 50 formed in the outer circumference of the cutting tool 20.

Each carbide insert 48 is held in position by a recessed screw 52, with the carbide insert 48 being thereby easily loosened and rotated in order to place a new cutting edge at the cutting surface.

Figure 8A:
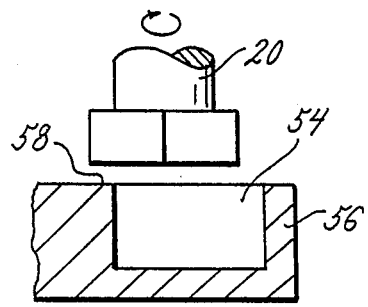
FIG. 8a–e is a series of drawings depicting the various steps in the method for lineal milling with the tool.
Figure 8B:
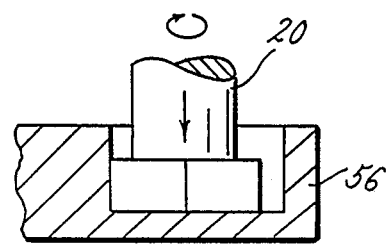
Figure 8C:
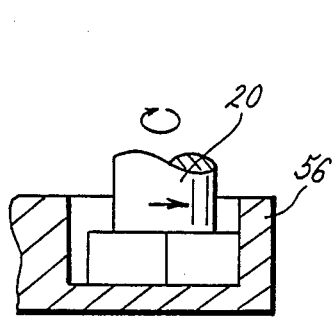
Figure 8D:
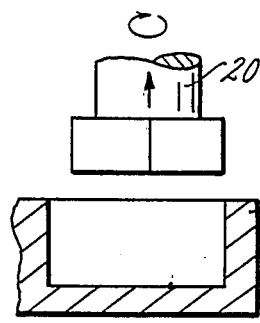
Figure 8E:
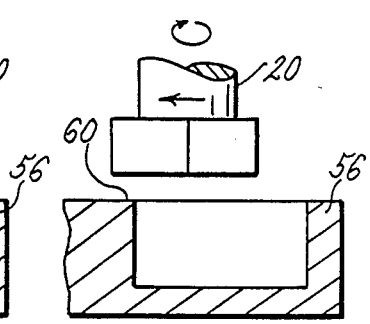

As best shown in FIGS. 8a–e, the cutting tool 20 of the present invention may be either manually or automatically programmed to lineally mill a pocket opening through an elegantly simple method which takes maximum advantage of the annular cutting swath of the tool. As shown in FIG. 8a, an opening 54 may already be placed in a workpiece 56 with a conventional tool, with the cutting tool 20 being rotated at substantially high rates of speed with its annulus of cut overlapping the edge and part of the surface 58 of the workpiece 56, as shown. After the tool 20 is thus positioned, it is lineally advanced into the workpiece 56 as shown in FIG. 8b in order to mill away the material underlying the "cutting annulus" defined by the carbide insert cutting surfaces as they are swept through an annulus by rotation of the tool 20. The tool 20 is advanced, as stated, in order to mill away material down to the depth of the previously formed opening 54, or otherwise as desired. After the tool 20 has reached the appropriate depth, it may be retracted first horizontally and then vertically from the workpiece in order to clear the workpiece and ensure a smoothly milled bottom surface on the workpiece. For some applications, the horizontal movement may not be required. These steps are shown in FIGS. 8c and 8d, respectively. Lastly, the cutting tool 20 may then be advanced to overlap another, adjacent, milled edge and overlap 60 of workpiece 56 which corresponds to the starting position shown in FIG. 8a. These steps may thus be repeated, as desired, in order to mill the workpiece 56. As the cutting edges of the tool define an annulus as the tool is rotated, the tool should be positioned so that the unmilled edge of the workpiece does not extend inside the innermost edge of the cutting annulus.

While greater amounts of material can be milled at higher rates by increasing the amount of overlap 58, 60; more precise milling edges may be achieved by decreasing the amount of overlap 58, 60 such that adjacent passes through the workpiece 56 are very closely spaced which can result in pocket openings having edges and sidewalls which may require little or no further machining. Of course, this represents a dramatic improvement over the prior art milling operations with drills which resulted in, at best, a series of arcuate scallops or the like forming the edges of the opening, even under the best of circumstances as they were capable of drilling holes having virtually no overlap. At worst, the milling operation with drills could not achieve any overlap between adjacent holes such that the material could not be entirely milled out of the opening, thereby requiring much additional machining for a finished opening.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a milling machine for lineal machining of metal from a workpiece, the milling machine having means to mount a cutting tool and advance it axially into the workpiece to thereby remove material therefrom, said tool mounting means including a spindle characterized by an outer, tapered annular surface and an axial cavity, the improvement comprising a cutting tool having an axial shank and an inner, tapered annular surface, and wherein said tool mounting means includes means to urge said axial shank into said axial cavity and said tapered surfaces into contact to thereby provide a bearing surface for supporting said tool as the machine is operated.

2. The device of claim 1 wherein said milling machine includes means to rotate said spindle and cutting tool at a substantially high speed and said cutting tool is substantially cylindrically shaped, with an outboard end extending substantially radially away from the spindle, said cutting tool including at least one cutting edge positioned at the outboard end and near the periphery thereof.

3. The device of claim 2 wherein said spindle has a center axis of rotation, and said axial shank and cavity and said tapered annular surfaces are substantially concentrically aligned thereto.

4. The device of claim 3 further comprising a plurality of cutting edges and wherein said cutting edges circumscribe less than the full outboard end of said cutting tool when said cutting tool is rotated.

5. The device of claim 4 wherein said cutting edges circumscribe an annulus substantially at the outer periphery of the outboard end of the cutting tool.

6. A method for lineal machining of a workpiece utilizing the device of claim 1 comprising the steps of advancing the tool lineally into the workpiece to thereby mill away material therefrom, retracting the tool from the workpiece, indexing the tool to a point where the tool at least partially overlaps a previously milled portion thereof, and repeating the previously recited steps until the workpiece is milled, as desired.

7. The method of claim 6 wherein the step of retracting the tool includes the steps of backing the tool away from the newly milled edge and withdrawing the tool from the opening.

8. The method of claim 7 wherein the tool includes a plurality of cutting edges mounted to the tool so that as the tool is rotated the cutting edges circumscribe an annulus about the outer periphery thereof and wherein the step of indexing the tool includes the step of positioning the tool so that the edge of the workpiece does not extend inside the innermost edge of said cutting annulus.

9. In a milling machine for lineal machining of a workpiece, the machine including a rotating cutting tool mounted to a tool holder by an axial shank inserting into an axial cavity and an axially mounted draw bolt, the machine having means to advance the cutting tool axially into the workpiece to thereby remove material therefrom, the improvement comprising the tool holder having a generally cone shaped outer surface and means to support the cutting tool from the cone shaped outer surface of the tool holder to thereby support the cutting tool across substantially the entire width of the tool holder to thereby maximize the cutting tool's resistance to rail deflection as it is lineally advanced into the workpiece.

10. The device of claim 9 wherein the tool includes a plurality of cutting edges, and means mounting said cutting edges to the tool so that as the tool is rotated said cutting edges circumscribe an annulus about the outer periphery of said tool.

11. The device of claim 10 wherein the outer surface of the tool holder supporting the tool comprises a male tapered surface concentric to the axis of rotation of the tool holder and the tool's supporting surface comprises a female tapered surface concentric to the axis of rotation of the tool holder.

12. The device of claim 11 wherein the tool includes a flute associated with each cutting edge for facilitating the removal of chips from the workpiece as it is milled.

13. The device of claim 12 wherein each of the plurality of cutting edges comprises a replaceable carbide insert.

* * * * *